US011124125B2

United States Patent
Faarup et al.

(10) Patent No.: US 11,124,125 B2
(45) Date of Patent: Sep. 21, 2021

(54) VEHICLE STORAGE COMPARTMENT HAVING A DAMPENER AND VEHICLE INCORPORATING THE VEHICLE STORAGE COMPARTMENT

(71) Applicant: GM GLOBAL TECHNOLOGY OPERATIONS LLC, Detroit, MI (US)

(72) Inventors: John H. Faarup, Waterford, MI (US); Alan Harding, Rochester Hills, MI (US); Charles P. Byers, Troy, MI (US); Nicholas P. Thomas, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 16/268,553

(22) Filed: Feb. 6, 2019

(65) Prior Publication Data
US 2020/0248492 A1 Aug. 6, 2020

(51) Int. Cl.
*B60R 7/06* (2006.01)
*E05F 5/02* (2006.01)
*B60R 7/04* (2006.01)

(52) U.S. Cl.
CPC ............... *B60R 7/06* (2013.01); *B60R 7/04* (2013.01); *E05F 5/022* (2013.01); *E05Y 2201/212* (2013.01); *E05Y 2201/26* (2013.01); *E05Y 2900/538* (2013.01)

(58) Field of Classification Search
CPC . B60R 7/06; E05Y 2201/212; E05Y 2201/26; E05Y 2900/538

USPC ........................................................ 296/37.12
See application file for complete search history.

(56) References Cited

U.S. PATENT DOCUMENTS

| | | | |
|---|---|---|---|
| 4,596,416 A * | 6/1986 | Muller | B60R 7/06 224/282 |
| 4,672,715 A | 6/1987 | Beckwith | |
| 4,725,089 A * | 2/1988 | Langer | B60R 7/06 217/60 D |
| 5,084,939 A | 2/1992 | Garman | |
| 5,413,317 A * | 5/1995 | Spoerre | B60N 3/10 16/341 |
| 5,951,083 A | 9/1999 | Bittinger et al. | |
| 6,131,242 A | 10/2000 | Zipperle et al. | |
| 6,799,785 B1 | 10/2004 | Davis, Jr. | |
| 7,717,009 B2 * | 5/2010 | Cho | E05F 5/00 74/422 |
| 8,978,203 B2 | 3/2015 | Krajenke et al. | |
| 9,022,452 B2 | 5/2015 | Krajenke et al. | |
| 9,566,912 B2 | 2/2017 | Shami | |
| 2004/0140685 A1 * | 7/2004 | Bieck | B60R 11/02 296/37.12 |

(Continued)

*Primary Examiner* — Jason S Morrow

(57) ABSTRACT

A vehicle storage compartment includes a first vehicle component including a pin, a second vehicle component pivotally hinged to the first vehicle component. The first vehicle component and the second vehicle component define a storage cavity in which a vehicle occupant in a passenger compartment may store objects. The compartment includes a dampener arm that is pivotally rotatable about one of the first pin and the second pin and defining a slot enclosing the other one of the first pin and second pin. The dampener arm slot defines an interference fit with the other one of the first pin and the second pin such that pivoting of the second vehicle component is dampened.

19 Claims, 4 Drawing Sheets

(56) References Cited

U.S. PATENT DOCUMENTS

| | | | |
|---|---|---|---|
| 2006/0054630 A1* | 3/2006 | Katagiri | B60R 7/06 220/830 |
| 2006/0273090 A1* | 12/2006 | Katagiri | B60R 7/06 220/264 |
| 2012/0200107 A1* | 8/2012 | Kobayashi | B60R 7/06 296/37.12 |
| 2012/0279135 A1* | 11/2012 | Yanagita | B60K 37/04 49/404 |
| 2017/0009837 A1* | 1/2017 | Saito | F16F 9/5165 |
| 2020/0180514 A1* | 6/2020 | Gnielka | B60R 7/06 |

\* cited by examiner

VEHICLE STORAGE COMPARTMENT HAVING A DAMPENER AND VEHICLE INCORPORATING THE VEHICLE STORAGE COMPARTMENT

FIELD

The present disclosure relates to a vehicle storage compartment having a dampener and a vehicle incorporating the vehicle storage compartment.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle passenger compartments or cabins commonly include storage compartments that are accessible to vehicle occupants to provide storage for those occupants to store objects. Those storage compartments may include a first component and a second component which is pivotally hinged to the first component to define a storage cavity when the second component is in a first position and which provides access to the storage cavity to vehicle occupants when the second component is pivoted to a second position. Conventionally, the pivotal motion of the second component relative to the first component may be dampened with a dampener. These dampeners may include a piston and cylinder type of dampener which includes a piston slidably movable within a cylindrical housing. Another type of conventional dampener may include a piston and cylinder and which further includes a biasing spring that further controls motion of the piston within the cylinder. The piston in these dampeners may also be connected to a cord which attaches to one of the first component and the second component. These conventional dampeners occupy valuable space within the vehicle and include multiple parts which increase the cost and reduce the reliability of these dampeners.

SUMMARY

In an exemplary aspect, a vehicle storage compartment includes a first vehicle component including a first pin, a second vehicle component hinged to the first vehicle component and pivotally rotatable about the hinge between a first position and a second position and including a second pin. The first vehicle component and the second vehicle component define a storage cavity for a vehicle occupant in a passenger compartment to store objects. The storage cavity is closed when the second vehicle component is in the first position and the storage cavity includes an opening that is open from the passenger compartment when the second vehicle component is in the second position. The vehicle storage compartment further includes a dampener arm pivotally rotatable about one of the first pin and the second pin and defining a slot enclosing the other one of the first pin and the second pin. The dampener arm slot defines an interference fit with the other one of the first pin and the second pin such that pivotal motion of the second vehicle component between the first position and the second position is dampened.

In this manner, opening and closing of a vehicle storage compartment may be damped using a dampener which is significantly less complex, less costly, occupies far less space, reduces tolerance requirements, and requires fewer parts than conventional dampeners.

In another exemplary aspect, the first vehicle component remains stationary within the vehicle and the second vehicle component pivots relative to the vehicle and the first vehicle component.

In another exemplary aspect, the first vehicle component includes a slot that receives the second pin.

In another exemplary aspect, the dampener arm is pivotally rotatable about the first pin.

In another exemplary aspect, the dampener arm slot defines an interference fit with the second pin.

In another exemplary aspect, the dampener arm is pivotally rotatable about the second pin.

In another exemplary aspect, the dampener arm slot defines an interference fit with the first pin.

In another exemplary aspect, the dampener arms extend along substantially the entire length of the dampener.

In another exemplary aspect, the dampener arm includes an L-shaped dampener arm.

In another exemplary aspect, a proximal end of the dampener arm receives one of the first pin and the second pin and the slot enclosing the other one of the first pin and the second pin is positioned at a distal end of the dampener arm.

In another exemplary aspect, the first vehicle component further includes a landing that limits rotation of the dampener arm.

In another exemplary aspect, the amount of interference between the slot and the other one of the first pin and the second pin varies along the length of the slot.

In another exemplary aspect, a thickness of the arms of the dampener arm defining the slot vary along the length of the slot.

In another exemplary aspect, a width of the arms of the dampener arm defining the slot vary along the length of the slot.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
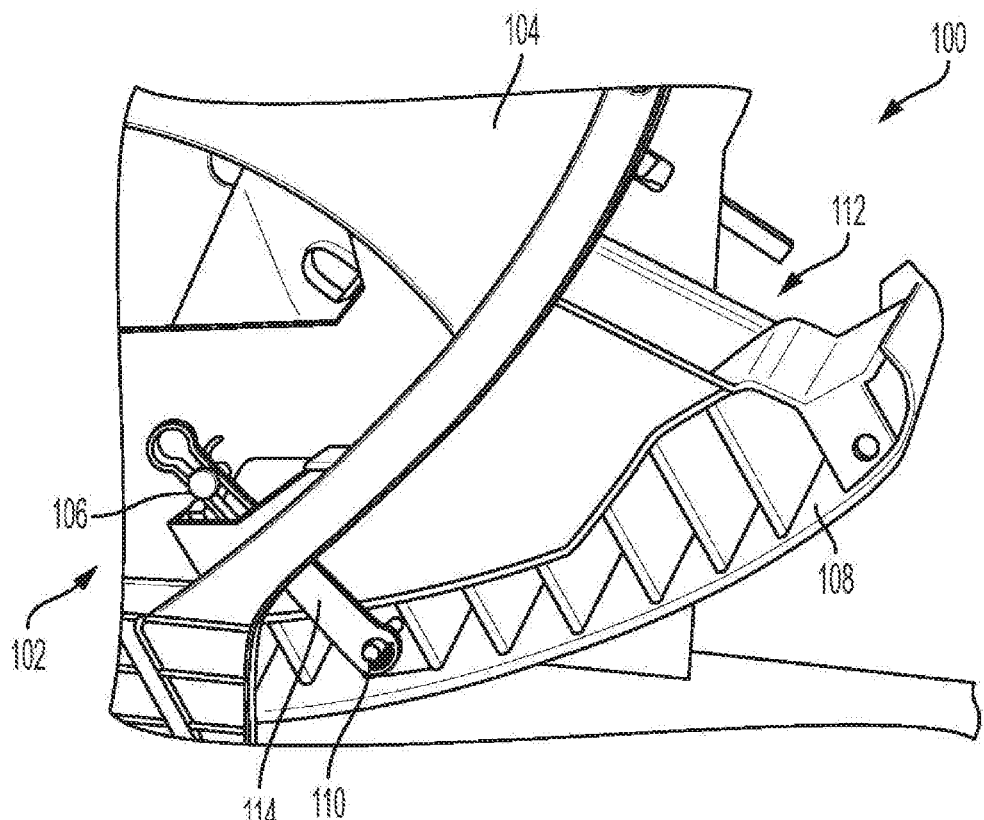
FIG. 1 is a perspective view of a vehicle storage compartment including a dampener in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 2:
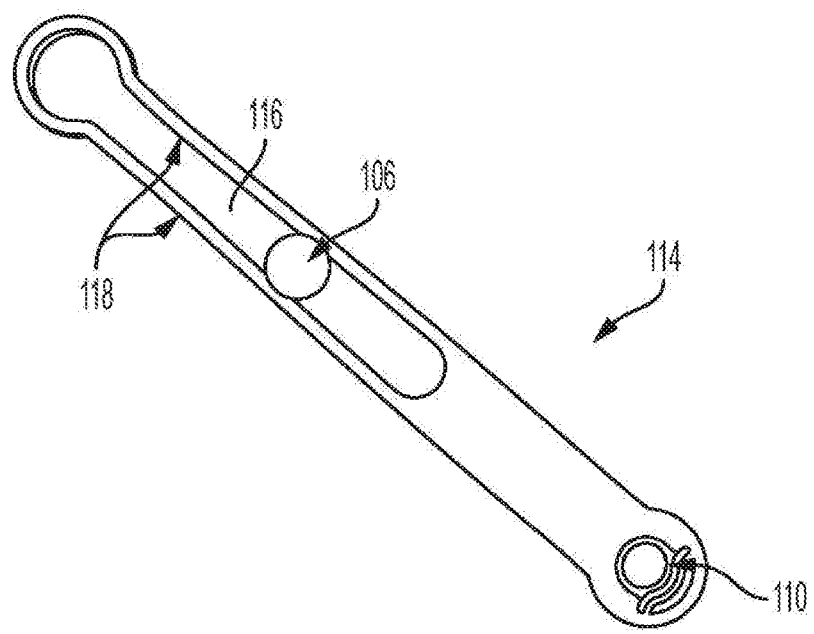
FIG. 2 is a close-up perspective view of the dampener of FIG. 1.

FIG. 1 is a perspective view of a vehicle storage compartment 100 including a dampener 102 in accordance with an exemplary embodiment of the present disclosure. The vehicle storage compartment 100 includes a first vehicle component 104 which includes a first pin 106 and a second vehicle component 108 which includes a second pin 110. The second vehicle component 108 is pivotally hinged to the first vehicle component 104 between a first position (not shown) and a second position (illustrated in FIG. 1). The first vehicle component 104 and the second vehicle component 108 define a storage cavity 112 which may be used by a vehicle occupant in a passenger compartment to store objects. The storage cavity 112 is enclosed entirely and inaccessible to the passenger compartment when the second vehicle component 108 is in the first position and is open to the passenger compartment when the second vehicle component 108 is in the second position. The dampener 102 includes a dampener arm 114 that is pivotally connected to the second pin 110 and includes a slot 116 defined by arms 118 which provide an interference fit between the arms 118 and the first pin 106. Pivotal rotation of the second vehicle component 108 relative to the first vehicle component 104 causes the first pin 106 to translatably slide within the slot 116 and friction between the arms 118 and the first pin 106 result in a force being applied by the dampener arm to oppose pivotal motion of the second vehicle component 108 relative to the first vehicle component 104. In this manner, the friction between the arms 118 and the first pin 106 dampen the pivotal rotation of the second vehicle component 108 relative to the first vehicle component 104. While the dampener arm 114 illustrated in FIGS. 1 and 2 is pivotal about the second pin 110 and slidably translatable over the first pin 106, it is understood that the orientation of the dampener may be reversed such that the dampener arm 114 is pivotal about the first pin 106 and slidably translatable over the second pin 110.

With the dampener for the vehicle storage compartment of the present disclosure relying upon a friction between a pin and arms in a slot in the dampener arm to determine the dampening force, the inventors understand that the amount of friction is dependent upon multiple factors. The friction may be increased by increasing the interference between the dampener arms and the pin. Alternatively, the friction may be decreased by decreasing the interference between the dampener arms and the pin. The friction may also be increased by increasing the stiffness of the arms to reduce the amount of deflection away from the pin as the pin moves along the slot. For example, the thickness and/or width of the arms 118 may be selected to control the amount of deflection of the arms as the pin travels through the slot. Additionally, the type of material selected for the dampener arms and the pin also may affect the relative amount of friction and, thus, dampening force provided by the dampener. In a preferred embodiment, the dampener is made of a material that provides a lubricating effect between the pin and the dampener arms to reduce wear and to improve the motion of the pin through the slot of the dampener.

Further the amount of friction may also be varied along the length of the slot 116 such that the dampening force varies as the second vehicle component 108 pivots relative to the first vehicle component 104. For example, the amount of interference between the arms 118 and the pin may vary along the length of the slot 116. Additionally, the friction may be variably controlled by varying the thickness and/or relative stiffness of the arms 118 along the length of the slot 116.

Figure 3:
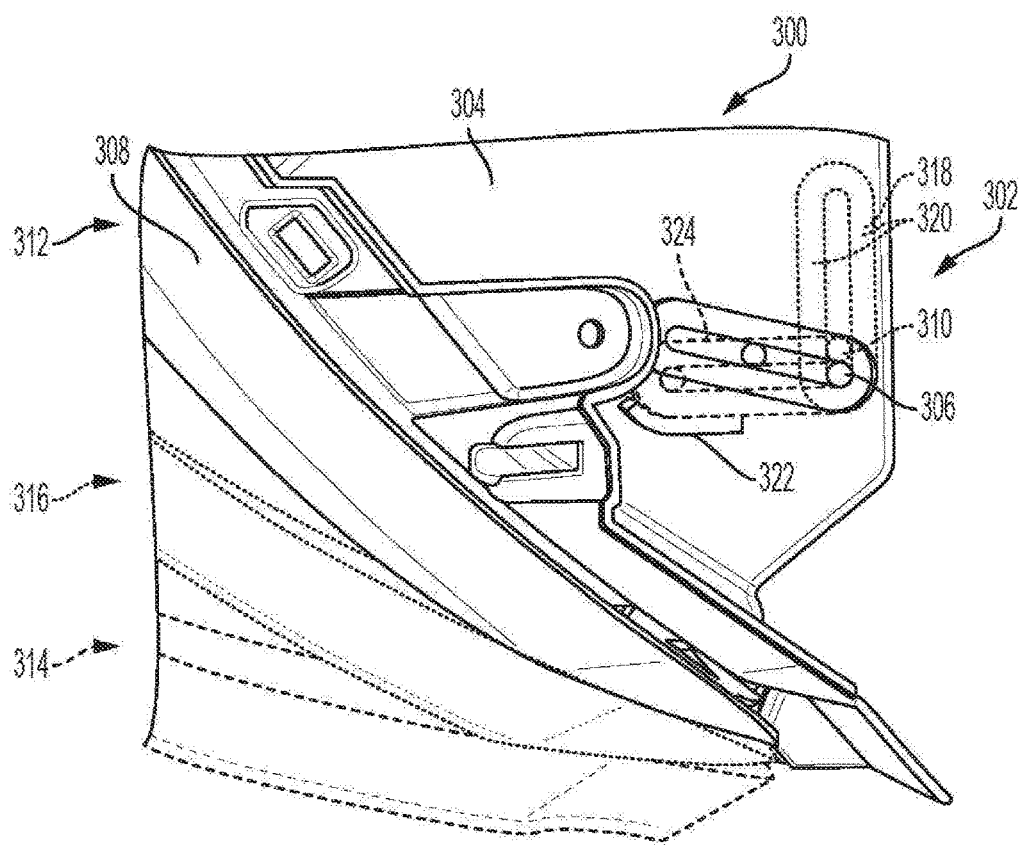
FIG. 3 is a perspective view of another vehicle storage compartment including a dampener in accordance with another exemplary embodiment of the present disclosure.

FIG. 3 is a perspective view of another vehicle storage compartment 300 including a dampener 302 in accordance with another exemplary embodiment of the present disclosure. The vehicle storage compartment 300 includes a first vehicle component 304 that includes a first pin 306 and a second vehicle component 308 that includes a second pin 310. The second vehicle component 308 is pivotally hinged to the first vehicle component 304. FIG. 3 illustrates the second vehicle component 308 in a first position 312, a second position 314, and an intermediate position 316, between the first position 312 and the second position 314. When the second vehicle component 308 is in the first position 312, the first vehicle component 304 and the second vehicle component 308 define a storage cavity for a vehicle occupant in a passenger compartment to store objects. The storage cavity is closed from access from the passenger compartment when the second vehicle component 308 is in the first position 312. The storage cavity is open to access from the passenger compartment when the second vehicle component 308 is in the second position 314. The dampener 302 of the vehicle storage compartment 300 includes a dampener arm 318 that includes arms 320 that define a slot in which first pin 306 and second pin 310 may translate when the second vehicle component 308 pivots between the first position 312 and the second position 314. First vehicle component 304 further includes a landing 322 which limits the rotation of the dampener arm 318 about the first pin 306. Further, first vehicle component 304 may include a slot 324 along which the second pin 310 may travel while the second vehicle component 308 pivots between the first position 312 and the second position 314.

Figure 4:
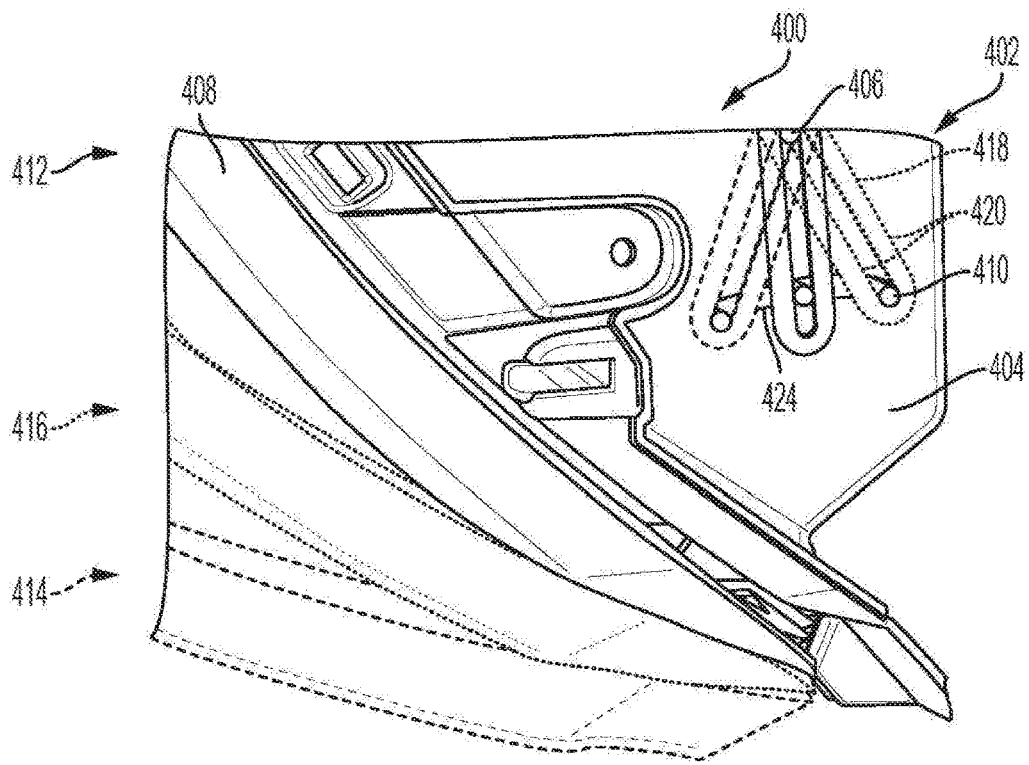
FIG. 4 is a perspective view of another vehicle storage compartment including a dampener in accordance with another exemplary embodiment of the present disclosure.

FIG. 4 is a perspective view of another vehicle storage compartment 400 including a dampener 402 in accordance with another exemplary embodiment of the present disclosure. The vehicle storage compartment 400 includes a first vehicle component 404 that includes a first pin 406 and a second vehicle component 408 that includes a second pin 410. The second vehicle component 408 is pivotally hinged to the first vehicle component 404. FIG. 4 illustrates the second vehicle component 408 in a first position 412, a second position 414, and an intermediate position 416, between the first position 412 and the second position 414. When the second vehicle component 408 is in the first position 412, the first vehicle component 404 and the second vehicle component 408 define a storage cavity for a vehicle occupant in a passenger compartment to store objects. The storage cavity is closed from access from the passenger compartment when the second vehicle component 408 is in the first position 412. The storage cavity is open to access from the passenger compartment when the second vehicle component 408 is in the second position 414. The dampener 402 of the vehicle storage compartment includes a dampener arm 418 that includes arms 420 that define a slot in which first pin 406 and second pin 410 may translate when the second vehicle component 408 pivots between the first position 412 and the second position 414. Further, first vehicle component 404 may include a slot 424 along which the second pin 410 may travel while the second vehicle component 408 pivots between the first position 412 and the second position 414.

Figure 5:
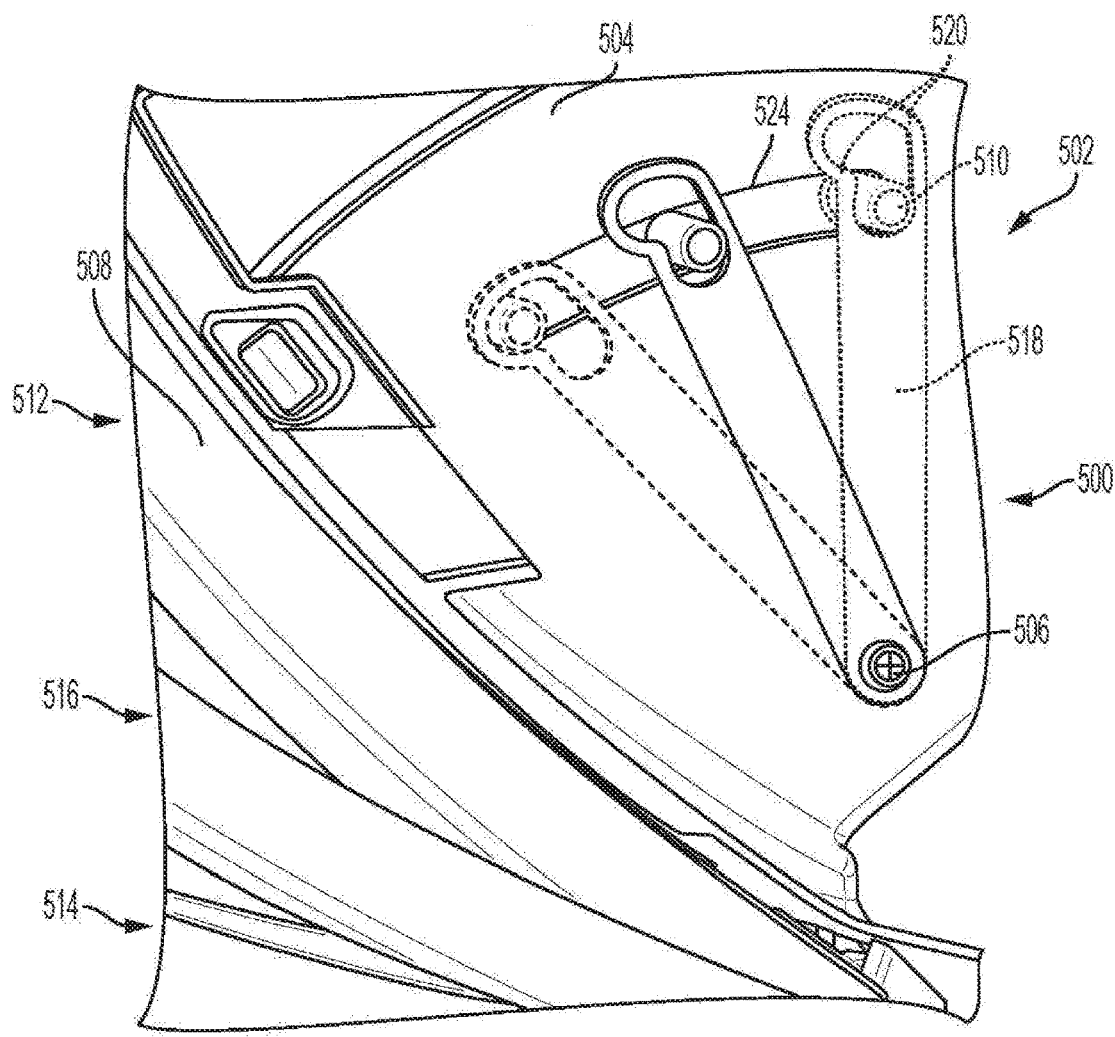
FIG. 5 is a perspective view of another vehicle storage compartment including a dampener in accordance with another exemplary embodiment of the present disclosure.

FIG. 5 is a perspective view of another vehicle storage compartment 500 including an L-shaped dampener 502 in accordance with another exemplary embodiment of the present disclosure. The vehicle storage compartment 500 includes a first vehicle component 504 that includes a first pin 506 and a second vehicle component 508 that includes a second pin 510. The second vehicle component 508 is pivotally hinged to the first vehicle component 504. FIG. 5 illustrates the second vehicle component 508 in a first position 512, a second position 514, and an intermediate position 516, between the first position 512 and the second position 514. When the second vehicle component 508 is in the first position 512, the first vehicle component 504 and the second vehicle component 508 define a storage cavity for a vehicle occupant in a passenger compartment to store objects. The storage cavity is closed from access from the passenger compartment when the second vehicle component 508 is in the first position 512. The storage cavity is open to access from the passenger compartment when the second vehicle component 508 is in the second position 514. A distal end of the dampener 502 of the vehicle storage compartment 500 includes a dampener arm 518 that includes arms 520 that define a slot in which first pin 506 and second pin 510 may translate when the second vehicle component 508 pivots between the first position 512 and the second position 514. A proximal end of the dampener 502 receives the first pin 506. Further, first vehicle component 504 may include a slot 524 along which the second pin 510 may travel while the second vehicle component 508 pivots between the first position 512 and the second position 514.

Figure 6:
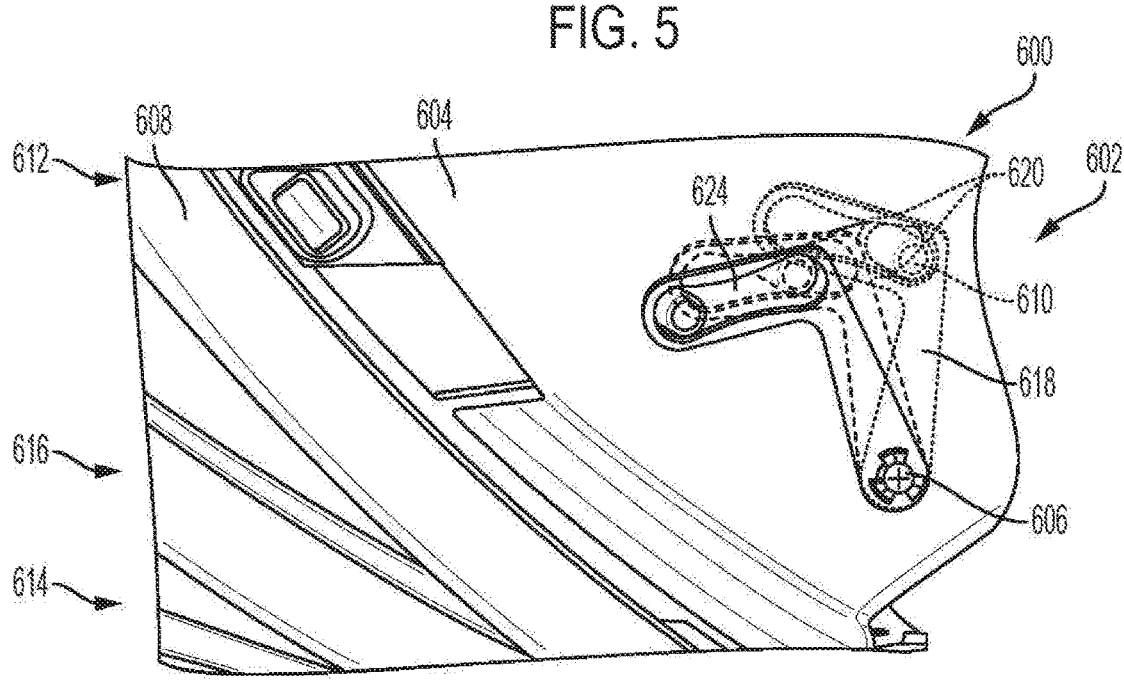
FIG. 6 is a perspective view of another vehicle storage compartment including a dampener in accordance with another exemplary embodiment of the present disclosure.

FIG. 6 is a perspective view of another vehicle storage compartment 600 including a dampener 602 in accordance with another exemplary embodiment of the present disclosure. The vehicle storage compartment 600 includes a first vehicle component 604 that includes a first pin 606 and a second vehicle component 608 that includes a second pin 610. The second vehicle component 608 is pivotally hinged to the first vehicle component 604. FIG. 6 illustrates the second vehicle component 608 in a first position 612, a second position 614, and an intermediate position 616, between the first position 612 and the second position 614. When the second vehicle component 608 is in the first position 612, the first vehicle component 604 and the second vehicle component 608 define a storage cavity for a vehicle occupant in a passenger compartment to store objects. The storage cavity is closed from access from the passenger compartment when the second vehicle component 608 is in the first position 612. The storage cavity is open to access from the passenger compartment when the second vehicle component 608 is in the second position 614. The dampener 602 of the vehicle storage compartment 600 includes a dampener arm 618 that includes arms 620 that define a slot in which first pin 606 and second pin 610 may translate when the second vehicle component 608 pivots between the first position 612 and the second position 614. Further, first vehicle component 604 may include a slot 624 along which the second pin 610 may travel while the second vehicle component 608 pivots between the first position 612 and the second position 614.

Figure 7:
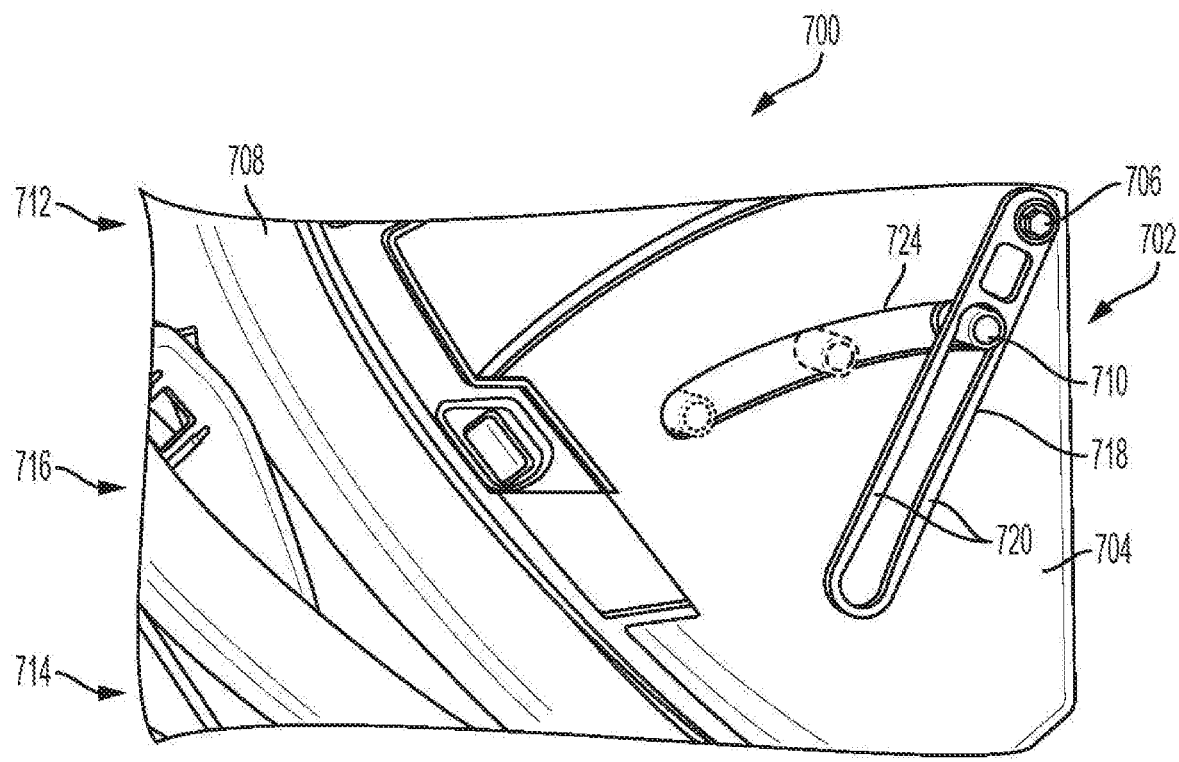
FIG. 7 is a perspective view of another vehicle storage compartment including a dampener in accordance with another exemplary embodiment of the present disclosure.

FIG. 7 is a perspective view of another vehicle storage compartment 700 including a dampener 702 in accordance with another exemplary embodiment of the present disclosure. The vehicle storage compartment 700 includes a first vehicle component 704 that includes a first pin 706 and a second vehicle component 708 that includes a second pin 710. The second vehicle component 708 is pivotally hinged to the first vehicle component 704. FIG. 7 illustrates the second vehicle component 708 in a first position 712, a second position 714, and an intermediate position 716, between the first position 712 and the second position 714. When the second vehicle component 708 is in the first position 712, the first vehicle component 704 and the second vehicle component 708 define a storage cavity for a vehicle occupant in a passenger compartment to store objects. The storage cavity is closed from access from the passenger compartment when the second vehicle component 708 is in the first position 712. The storage cavity is open to access from the passenger compartment when the second vehicle component 708 is in the second position 714. The dampener 702 of the vehicle storage compartment 700 includes a dampener arm 718 that includes arms 720 that define a slot in which first pin 706 and second pin 710 may translate when the second vehicle component 708 pivots between the first position 712 and the second position 714. Further, first vehicle component 704 may include a slot 724 along which the second pin 710 may travel while the second vehicle component 708 pivots between the first position 712 and the second position 714.

Figure 8:
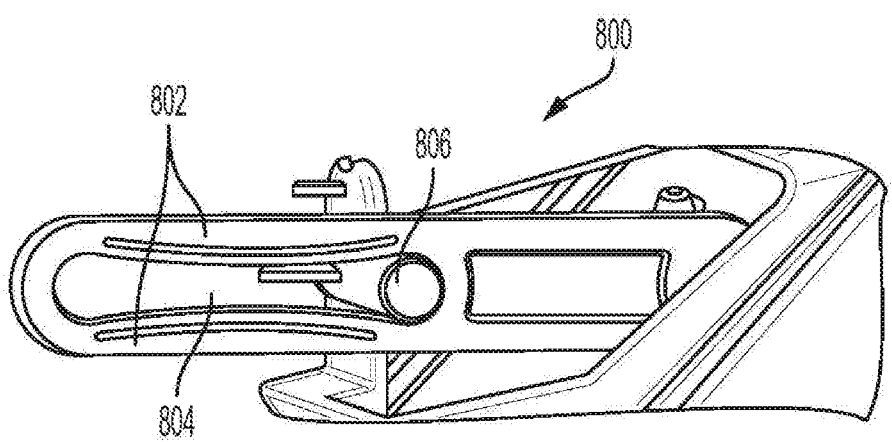
FIG. 8 is a close up perspective view of another exemplary embodiment of a dampener in accordance with the present disclosure.

FIG. 8 is a close up perspective view of another exemplary embodiment of a dampener 800 in accordance with the present disclosure. The dampener 800 includes arms 802 defining a slot 804 through which a pin 806, that may be connected to a pivotally movable vehicle component, may travel. The thickness and width of the arms 802 varies along the length of the slot such that the dampening force applied by the dampener 800 varies.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle storage compartment comprising:
   a first vehicle component including a first pin;
   a second vehicle component hinged to the first vehicle component and pivotally rotatable about the hinge between a first position and a second position and including a second pin, wherein the first vehicle component and the second vehicle component define a storage cavity for a vehicle occupant in a passenger compartment to store objects, wherein the storage cavity is closed when the second vehicle component is in the first position and the storage cavity includes an opening that is open from the passenger compartment when the second vehicle component is in the second position; and a dampener arm pivotally rotatable about one of the first pin and the second pin and defining a dampener arm slot enclosing the other one of the first pin and the second pin, wherein the dampener arm slot defines an interference fit with the other one of the first pin and the second pin such that pivotal motion of the second vehicle component between the first position and the second position is dampened.

2. The vehicle storage compartment of claim 1, wherein the first vehicle component remains stationary within the vehicle and the second vehicle component pivots relative to the vehicle and the first vehicle component.

3. The vehicle storage compartment of claim 2, wherein the first vehicle component includes a slot that receives the second pin.

4. The vehicle storage compartment of claim 1, wherein the dampener arm is pivotally rotatable about the first pin.

5. The vehicle storage compartment of claim 4, wherein the dampener arm slot defines an interference fit with the second pin.

6. The vehicle storage compartment of claim 1, wherein the dampener arm is pivotally rotatable about the second pin.

7. The vehicle storage compartment of claim 6, wherein the dampener arm slot defines an interference fit with the first pin.

8. The vehicle storage compartment of claim 1, wherein the dampener arm comprises an L-shaped dampener arm.

9. The vehicle storage compartment of claim 1, wherein a proximal end of the dampener arm receives one of the first pin and the second pin and the slot enclosing the other one of the first pin and the second pin is positioned at a distal end of the dampener arm.

10. The vehicle storage compartment of claim 1, wherein the first vehicle component further includes a landing that limits rotation of the dampener arm.

11. The vehicle storage compartment of claim 1, wherein the amount of interference between the slot and the other one of the first pin and the second pin varies along a length of the slot.

12. The vehicle storage compartment of claim 11, wherein a thickness of the dampener arm defining the slot varies along the length of the slot.

13. The vehicle storage compartment of claim 11, wherein a width of the dampener arm defining the slot varies along the length of the slot.

14. A vehicle including a vehicle storage compartment, the vehicle storage compartment comprising:
a first vehicle component including a first pin;
a second vehicle component hinged to the first vehicle component and pivotally rotatable about the hinge between a first position and a second position and including a second pin, wherein the first vehicle component and the second vehicle component define a storage cavity for a vehicle occupant in a passenger compartment to store objects, wherein the storage cavity is closed when the second vehicle component is in the first position and the storage cavity includes an opening that is open from the passenger compartment when the second vehicle component is in the second position; and
a dampener arm pivotally rotatable about one of the first pin and the second pin and defining a dampener arm slot enclosing the other one of the first pin and the second pin, wherein the dampener arm slot defines an interference fit with the other one of the first pin and the second pin such that pivotal motion of the second vehicle component between the first position and the second position is dampened.

15. The vehicle of claim 14, wherein the first vehicle component remains stationary within the vehicle and the second vehicle component pivots relative to the vehicle and the first vehicle component.

16. The vehicle of claim 15, wherein the first vehicle component includes a slot that receives the second pin.

17. The vehicle of claim 14, wherein the dampener arm is pivotally rotatable about the first pin.

18. The vehicle of claim 17, wherein the dampener arm slot defines an interference fit with the second pin.

19. The vehicle of claim 14, wherein the dampener arm is pivotally rotatable about the second pin, and wherein the dampener arm slot defines an interference fit with the first pin.

* * * * *